US012669921B2

(12) United States Patent
Boyd et al.

(10) Patent No.: US 12,669,921 B2
(45) Date of Patent: Jun. 30, 2026

(54) CONTENT COLLECTION INDICATORS WITHIN A GROUP MESSAGING SYSTEM

(71) Applicant: Snap Inc., Santa Monica, CA (US)

(72) Inventors: Nathan Kenneth Boyd, Los Angeles, CA (US); Michael James Connolly, Mill Valley, CA (US); Daniel Vincent Grippi, New York, NY (US); Christie Marie Heikkinen, Sherman Oaks, CA (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 273 days.

(21) Appl. No.: 18/437,610

(22) Filed: Feb. 9, 2024

(65) Prior Publication Data

US 2025/0258590 A1     Aug. 14, 2025

(51) Int. Cl.
*G06F 3/04842* (2022.01)
*H04L 51/216* (2022.01)

(52) U.S. Cl.
CPC ........ *G06F 3/04842* (2013.01); *H04L 51/216* (2022.05)

(58) Field of Classification Search
CPC .... G06F 3/04842; H04L 51/216; H04L 51/52
See application file for complete search history.

(56) References Cited

U.S. PATENT DOCUMENTS

| | | |
|---|---|---|
| 5,754,939 A | 5/1998 | Herz et al. |
| 6,038,295 A | 3/2000 | Mattes |

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

"Surprise!", [Online] Retrieved from the Internet: <URL: https://www.snap.com/en-US/news/post/surprise>, (Oct. 3, 2013), 1 pg.

(Continued)

*Primary Examiner* — Cao H Nguyen
(74) *Attorney, Agent, or Firm* — Schwegman Lundberg & Woessner, P.A.

(57)          ABSTRACT

In one aspect, a method, includes identifying members of a group in a messaging application, detecting an active sharing of content collection from a member of the group, and generating a visual indicator corresponding to the group in a user interface of the messaging application. The method may also include further includes receiving user input from the member of the group to share the content collection with one or more members of the group, and in response to receiving the user input, enabling an ephemeral display of the content collection only from devices associated with the one or more members of the group, where detecting the active sharing of content collection from the member of the group is based on receiving the user input from the member of the group.

18 Claims, 17 Drawing Sheets

(56) References Cited

U.S. PATENT DOCUMENTS

| | | | |
|---|---|---|---|
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 11,146,514 B2 * | 10/2021 | Brandt | H04L 51/08 |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2010/0082427 A1 | 4/2010 | Burgener et al. | |
| 2010/0131880 A1 | 5/2010 | Lee et al. | |
| 2010/0185665 A1 | 7/2010 | Horn et al. | |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0286586 A1 | 11/2011 | Saylor et al. | |
| 2011/0320373 A1 | 12/2011 | Lee et al. | |
| 2012/0028659 A1 | 2/2012 | Whitney et al. | |
| 2012/0184248 A1 | 7/2012 | Speede | |
| 2012/0209921 A1 | 8/2012 | Adafin et al. | |
| 2012/0209924 A1 | 8/2012 | Evans et al. | |
| 2012/0254325 A1 | 10/2012 | Majeti et al. | |
| 2012/0278692 A1 | 11/2012 | Shi | |
| 2012/0304080 A1 | 11/2012 | Wormald et al. | |
| 2013/0071093 A1 | 3/2013 | Hanks et al. | |
| 2013/0194301 A1 | 8/2013 | Robbins et al. | |
| 2013/0290443 A1 | 10/2013 | Collins et al. | |
| 2014/0032682 A1 | 1/2014 | Prado et al. | |
| 2014/0122787 A1 | 5/2014 | Shalvi et al. | |
| 2014/0201527 A1 | 7/2014 | Krivorot | |
| 2014/0282096 A1 | 9/2014 | Rubinstein et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0199082 A1 | 7/2015 | Scholler et al. | |
| 2015/0227602 A1 | 8/2015 | Ramu et al. | |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0234149 A1 * | 8/2016 | Tsuda | H04L 67/306 |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0161382 A1 | 6/2017 | Ouimet et al. | |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0374003 A1 | 12/2017 | Allen et al. | |
| 2017/0374508 A1 | 12/2017 | Davis et al. | |

(56)                    References Cited

U.S. PATENT DOCUMENTS

| | | | | |
|---|---|---|---|---|
| 2018/0107342 A1* | 4/2018 | Deets, Jr. | .............. | H04L 51/234 |
| 2018/0241707 A1* | 8/2018 | Sarafa | ................. | H04L 63/0428 |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Castelluccia, Claude, et al., "EphPub: Toward robust Ephemeral Publishing", 19th IEEE International Conference on Network Protocols (ICNP), (Oct. 17, 2011), 18 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Fajman, "An Extensible Message Format for Message Disposition Notifications", Request for Comments: 2298, National Institutes of Health, (Mar. 1998), 28 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.

* cited by examiner

204

COLLECTION MANAGEMENT SYSTEM

CURATION INTERFACE — 206

SHORTCUT CAROUSEL USER INTERFACE — 302

SHORTCUT MANAGEMENT MODULE — 304

ACTIVE SHORTCUT MODULE — 306

800

802    IDENTIFY MEMBERS OF A GROUP IN A GROUP CHAT

804    DETECT ACTIVE STORY OF A MEMBER OF THE GROUP IN THE GROUP CHAT

806    GENERATE AND DISPLAY VISUAL INDICATOR INDICATIVE OF THE ACTIVE STORY IN A USER INTERFACE ASSOCIATED WITH THE GROUP CHAT

900

902 — GENERATE USER INTERFACE OF A FRIENDS FEED

904 — DETECT ACTIVE STORY OF A MEMBER OF A GROUP IN THE FRIENDS FEED

906 — GENERATE A VISUAL INDICATOR IDENTIFYING THE GROUP WITH THE ACTIVE STORY OF THE MEMBER OF THE GROUP

1000

1002 — GENERATE USER INTERFACE OF A GROUP CHAT

1004 — DETECT ACTIVE STORY OF A MEMBER OF THE GROUP IN THE GROUP CHAT

1006 — GENERATE VISUAL INDICATOR CORRESPONDING TO THE MEMBER IN THE GROUP CHAT BASED ON THE ACTIVE STORY OF THE MEMBER

1100

1102 — GENERATE A MESSAGING USER INTERFACE OF A GROUP CHAT

1104 — DETECT ACTIVE STORY OF A MEMBER OF THE GROUP IN THE GROUP CHAT

1106 — GENERATE VISUAL INDICATOR OF THE MEMBER ASSOCIATED WITH THE ACTIVE STORY IN THE MESSAGING USER INTERFACE

MESSAGING FEED USER INTERFACE

GROUP PROFILE USER INTERFACE

1404

1406

1402

1408

1410    1412

GROUP CONVERSATION USER INTERFACE

CONTENT COLLECTION INDICATORS WITHIN A GROUP MESSAGING SYSTEM

TECHNICAL FIELD

The present disclosure relates generally to a messaging system, including displaying content feed indicators within a messaging system.

BACKGROUND

Messaging systems provide for the exchange of message content between users. For example, a messaging system allows users to exchange content (e.g., text, images) with one or more other users.

BRIEF DESCRIPTION OF THE SEVERAL VIEWS OF THE DRAWINGS

The drawings, which are not necessarily drawn to scale, like numerals, may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
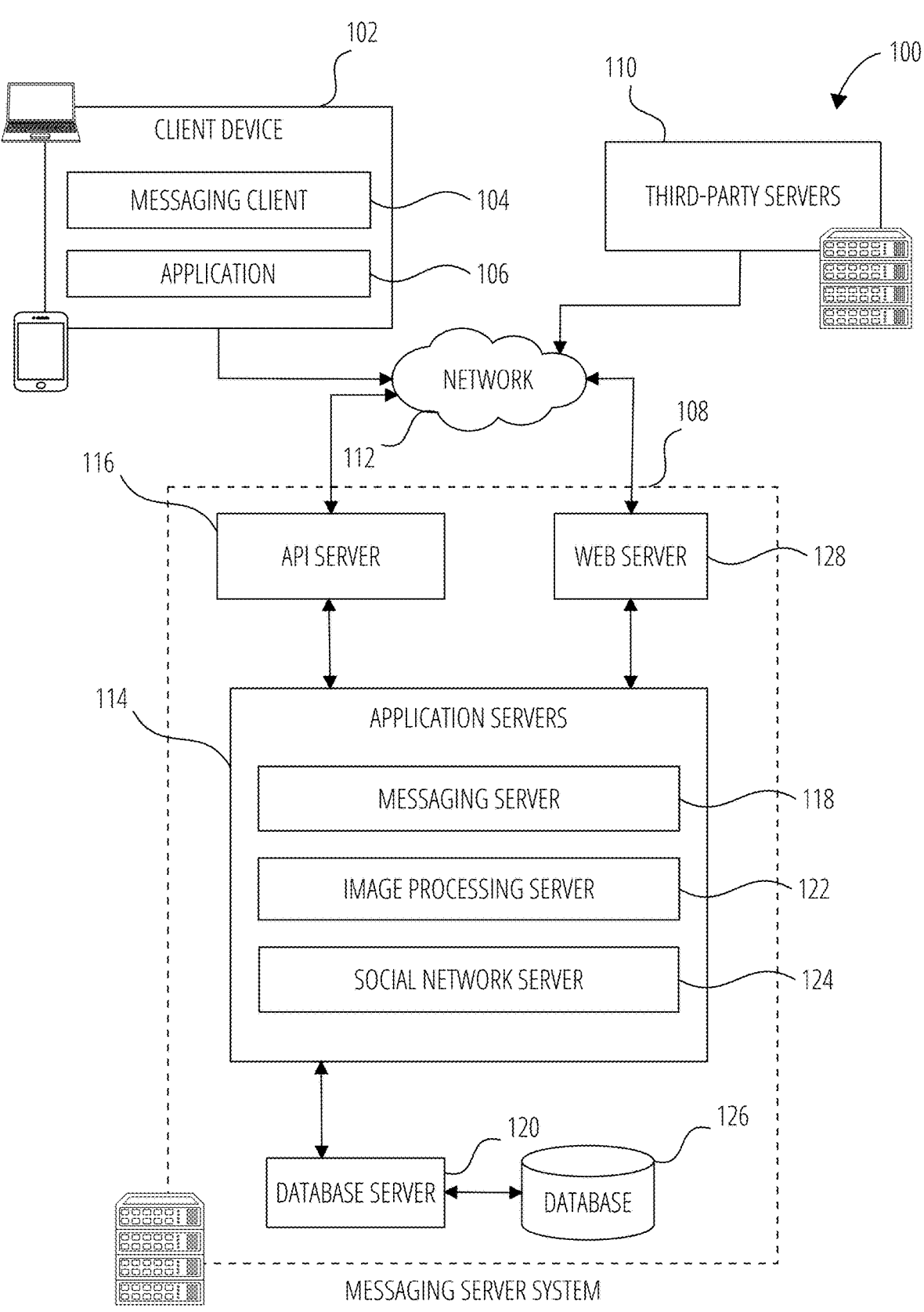
FIG. 1 is a diagrammatic representation of a networked environment in which the present disclosure may be deployed, in accordance with some examples.

A messaging system typically allows users to exchange media content items (e.g., messages, images and/or video) with one another in a message thread. As described herein, a messaging system may include content feeds for presenting content collections, where each content collection includes one or more media content items. For example, a messaging application enables a user to share content collection (e.g., multimedia messages) with their friends in a sequential order, which is no longer viewable after a preset time (e.g., 24 hours).

In one example, a messaging system allows a first user to create content collection including one or more media content items. The messaging system provides for the first user to share the content collection with one or more second user(s) selected by the first user. In this way, each of the first user and second user(s) are associated with the content collection. By virtue of being associated with the content collection, each of the first user and the second user(s) is able to view the content collection, and to add content (e.g., additional media content items) to the content collection. In addition, each of the first user and second user(s) is permitted to share the content collection with one or more selected third user(s).

In one example, the messaging application identifies members of a group in the messaging application, detects an active sharing of content collection from a member of the group, and generates a visual indicator corresponding to the group in a user interface of the messaging application. The messaging application is particularly useful for group communication, where users can share their experiences with multiple friends at once. The feature also provides an easy way for users to identify which groups have active content collection (e.g., referred to as Stories) and which members of the group are sharing content.

In one example, the present application describes a visual indicator that adds an indication to group chats when members have an active story. This visual indicator is especially helpful for people who only open the messaging application to respond to groups. An operating method of the messaging system includes identifying members of a group in a messaging application, detecting an active sharing of content collection from a member of the group, and generating a visual indicator corresponding to the group in a user interface of the messaging application. The method may also include further includes receiving user input from the member of the group to share the content collection with one or more members of the group, all members of the group, one or more users of the messaging application, one or more other users of the messaging application, or one or more other users outside the group, and in response to receiving the user input, enabling an ephemeral display of the content collection only from devices associated with the one or more members of the group, all members of the group, the one or more users of the messaging application, the one or more other users of the messaging application, or the one or more other users outside the group, where detecting the active sharing of content collection from the member of the group is based on receiving the user input from the member of the group. Other technical features may be readily apparent to one skilled in the art from the following figures, descriptions, and claims.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 5:
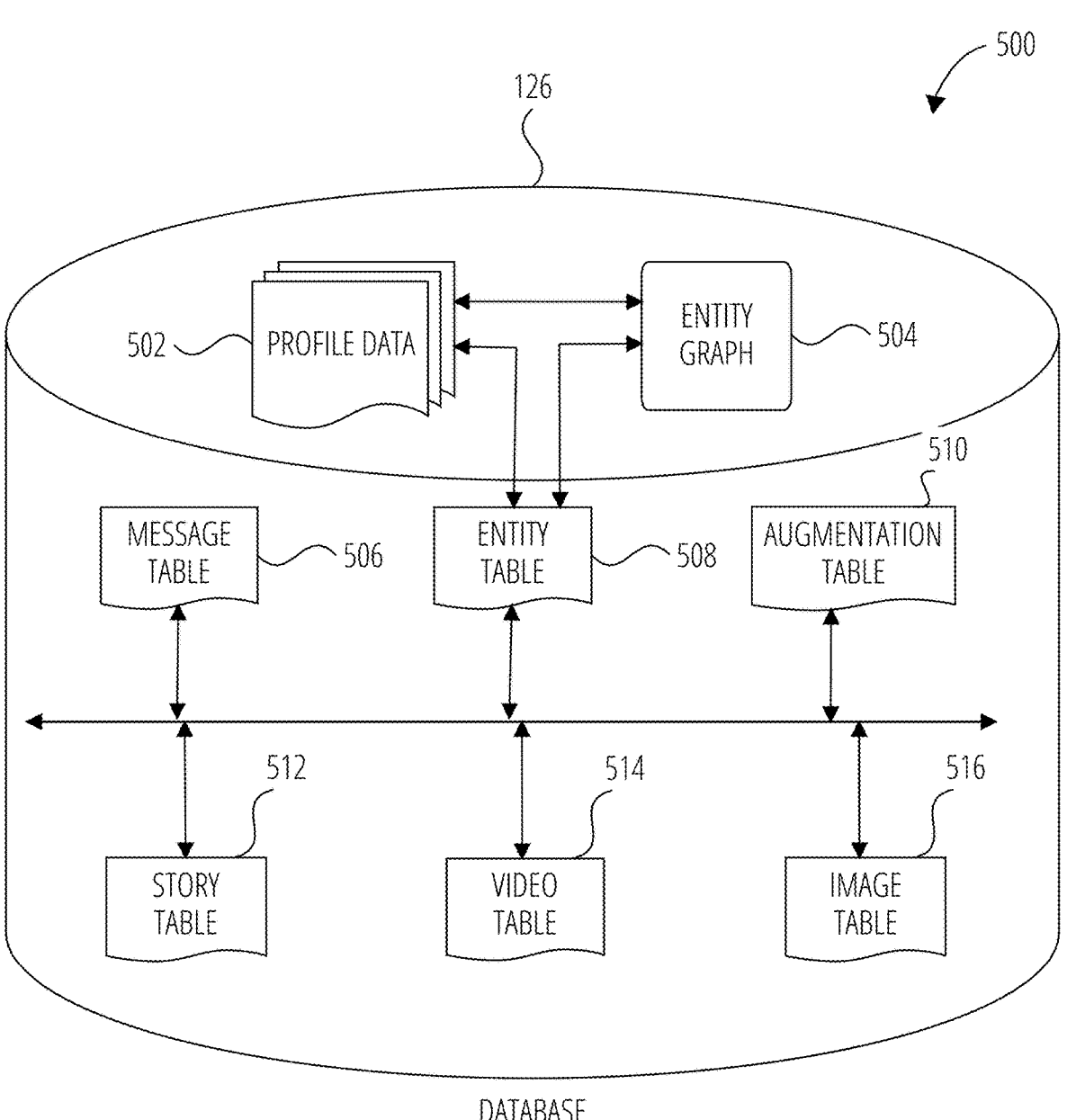
FIG. 5 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 504 (as shown in FIG. 5) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a.* ml file), an applet may incorporate a scripting language (e.g., a.* js file or a .json file) and a style sheet (e.g., a.* ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
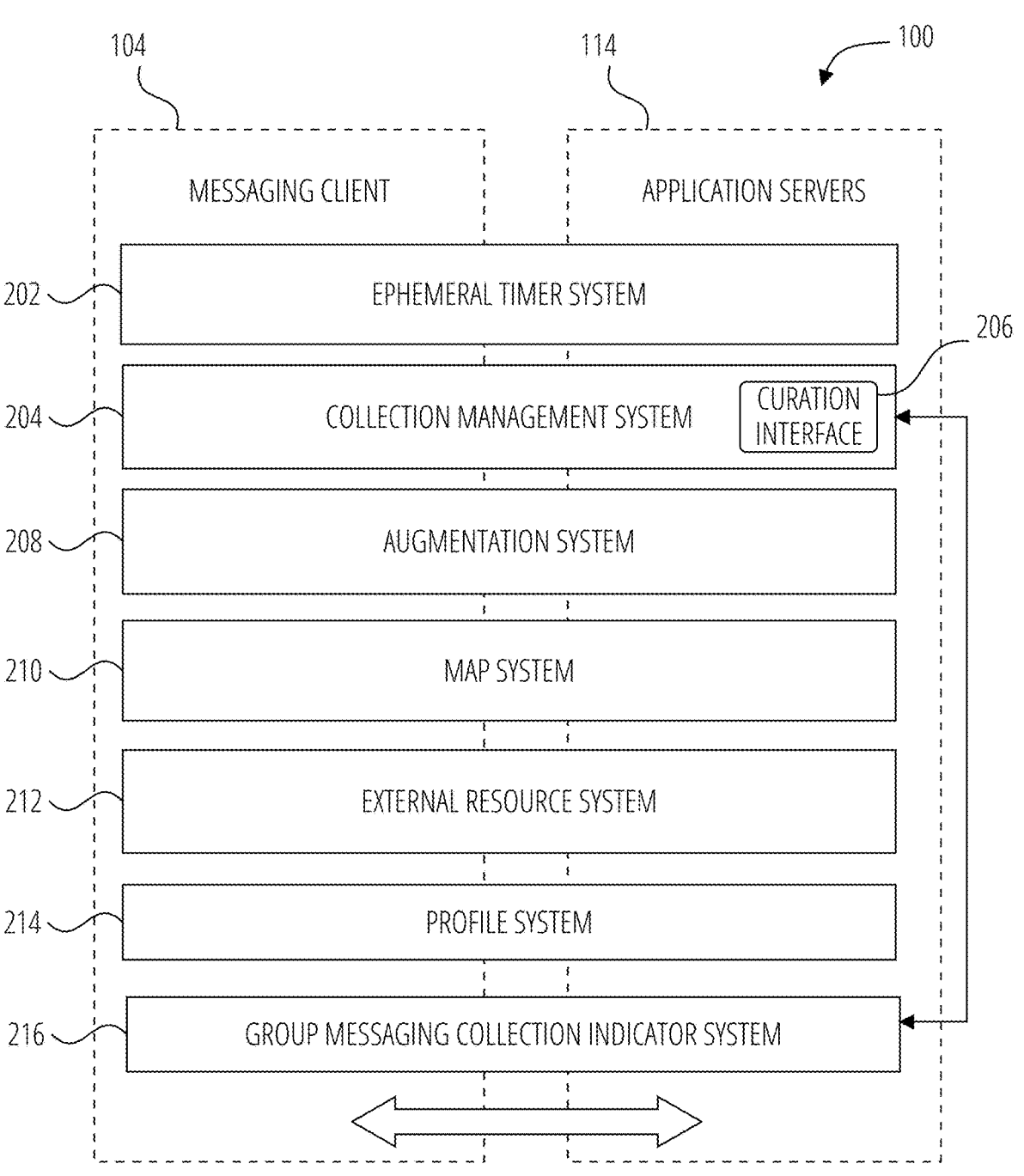
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, an external resource system 212, a profile system 214, and a group messaging collection indicator system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 5, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video.

The map system 210 provides various geographic location functions, and supports the presentation of map-based media content and messages by the messaging client 104. For example, the map system 210 enables the display of user icons or avatars (e.g., stored in profile data 502) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The profile system 214 implements various functions for maintaining profiles with respect to the messaging system 100. The profile data maintained by the profile system 214 may be selectively used and presented to other users of the messaging system 100, based on privacy settings specified by a particular entity.

From the perspective of an individual user, the profile system 214 provides for maintaining and presenting one or more of a self profile (e.g., "my profile"), friendship profiles, group profiles and public profiles. In one or more embodiments, a self profile corresponds to the individual user's own information in the messaging system such as a user name, telephone number, address, settings (e.g., notification and privacy settings), and/or a user-selected avatar representation (or collection of such avatar representations).

In one or more embodiments, a friendship profile includes information that is common to two users. Such information may include message content, such as but not limited to, images, videos, audio files, attachments, and messages (e.g., text-based messages), with any corresponding annotation data, exchanged within one or more message thread(s) with respect to the two users (e.g., friends). A group profile includes information similar to that of a friend profile, and applies to a group of users (e.g., 2 or more users).

In one or more embodiments, a public profile provides for maintaining and presenting information associated with an entity. For example, an entity associated with a public profile may be a publisher such as a merchant, business, social media influencer and/or advertiser. The entity may create a public profile to showcase their content to other users (e.g., all users) of the messaging system 100, instead of being limited to friends (e.g., in association with friend profiles). Moreover, the public profile provides for other users to select to subscribe to content provided by the entity (e.g., via a subscription button). For example, such content may be presented, along with other content from others, within a content feed provided by the messaging system 100.

The group messaging collection indicator system 216 allows users to create and participate in group conversations with other users. To start a group chat, a user can select multiple friends from their contact list or add users who are already participating in a group chat. Once a group is created, users can send text, image, and video messages to the entire group or to specific members of the group. Group messages are displayed in a chat thread format, with each message labeled with the sender's name and their profile picture. The group messaging collection indicator system 216 generates a notification or visual indicator that indicates that a member of a group has shared content collection (e.g., posted an active Story). In one example, the visual indicator identifies the group where the member has shared their content collection.

In other examples, the group messaging collection indicator system 216 includes several additional functionalities. Users can see who has read a message or is currently typing a response, and they can also react to messages with a variety of emojis. Additionally, users can mute notifications for individual group chats or leave a group chat altogether. The group messaging collection indicator system 216 also includes various safety and privacy measures. Users can report inappropriate content or behavior, block users from sending messages, and opt-out of receiving group chat invitations.

Figure 3:
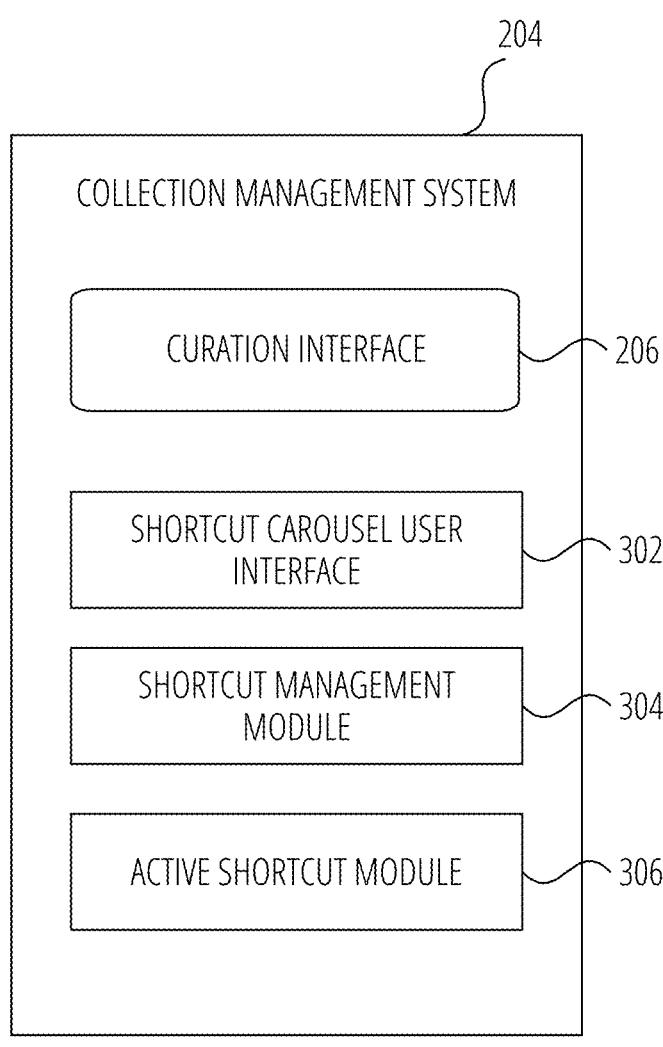
FIG. 3 illustrates a collection management system in accordance with one example embodiment.

FIG. 3 illustrates the collection management system 204 in accordance with one example embodiment. The collection management system 204 the curation interface 206, a shortcut carousel user interface 302, a shortcut management module 304, and an active shortcut module 306.

The shortcut carousel user interface 302 generates a carousel of icons (e.g., emoji) in a top portion of the curation interface 206. The icons in the carousel are shortcuts to enable the user of the client device 102 to select a particular group of users to post or send curated content (e.g., private stories) to. In other words, the user does not have to re-select each users or members of a group corresponding to the shortcut icon. In one example, the shortcut carousel user interface 302 includes emoji icons adjacent to a corresponding name of the shortcut.

The shortcut management module 304 enables the user to select and identify users as members mapped to the shortcut. For example, the user can add or remove individual members mapped to the shortcut. In another example, the user can name or add a description to the shortcut. In another example, the user can add or delete the shortcut from the carousel of icons.

In one example, the user can send curated content to the users mapped to a selected icon from the shortcut carousel. The users mapped to the selected icon will receive a notification of a message indicating the curated content or the availability of the curated content. In another example, the user can post the curated content to the social network server 124 so that only users mapped to the selected icon can view the curated content.

The active shortcut module 306 presents a list of active shortcuts and active shared curated content. For example, the list of active shortcuts indicates curated content associated with a shortcut and actively viewable by selected users (mapped to the shortcut). The shortcut may be associated with Private Stories that only users mapped to the shortcut can view. In one example, the curated content associated with the private viewing is viewable within a limited time frame (e.g., 24 hours from posting (to the shortcut) on the social network server 124). Therefore, the curated content is no longer viewable or accessible to the users (mapped to the shortcut) of the messaging system 100 after the limited time frame has elapsed.

The active shared curated content includes curated content that is actively viewable by all users (e.g., referred to as public viewing or public) or contacts of the user (e.g., referred to as My Stories) of the messaging system 100. In one example, the curated content associated with the public viewing is viewable within a limited time frame (e.g., 24 hours from posting to a public profile of the user on the social network server 124). In another example, the curated content associated with connected users is viewable within a limited time frame (e.g., 24 hours from posting to My Stories on the social network server 124). It is noted that the user memberships of My Stories is different from the user membership of each shortcut. For example, users mapped to a shortcut may be a subset of users mapped to My Stories. In another example, users mapped to a shortcut may not include users mapped to My Stories.

Figure 4:
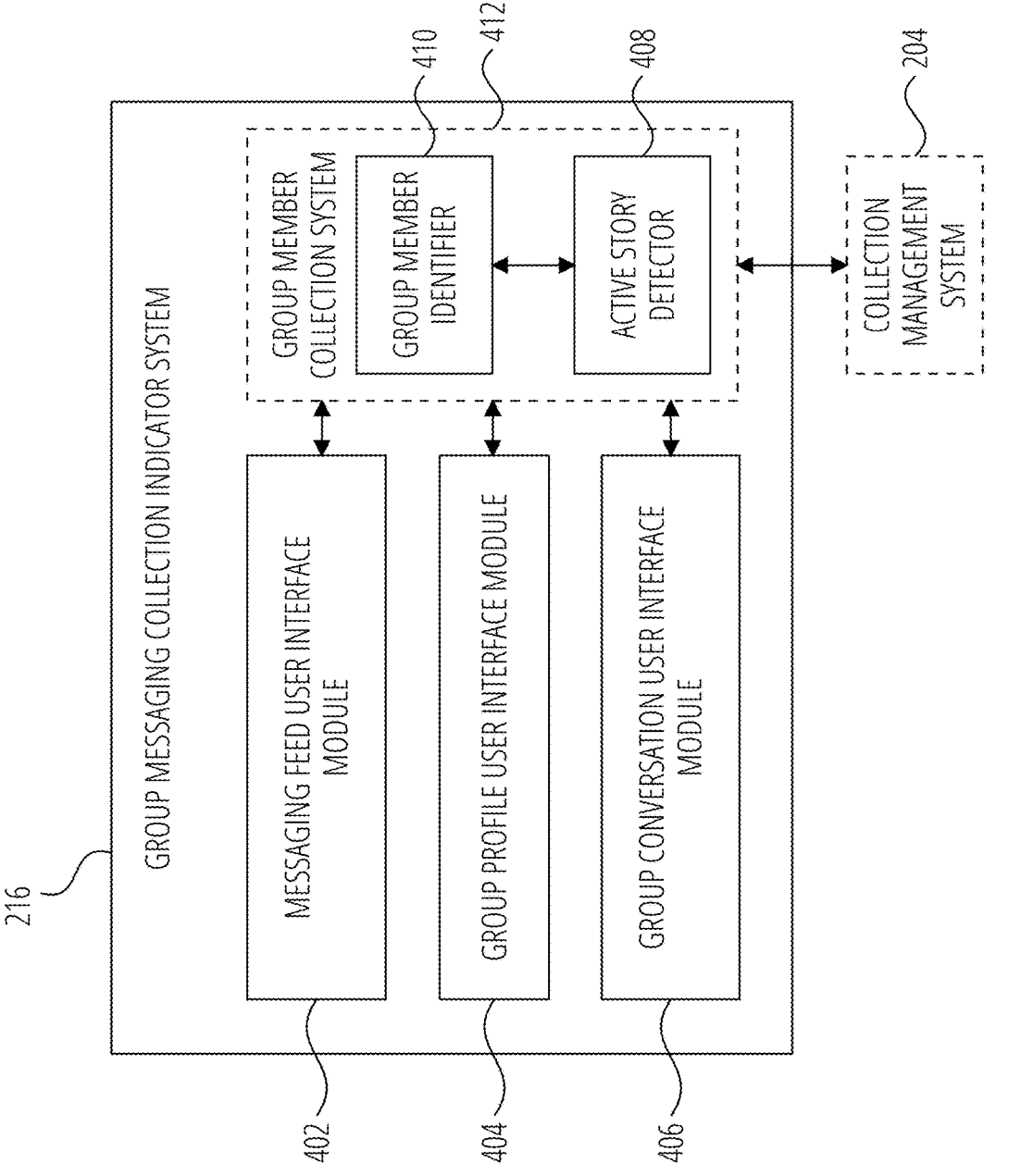
FIG. 4 illustrates a group messaging collection indicator system in accordance with one example embodiment.

FIG. 4 illustrates the group messaging collection indicator system 216 in accordance with one example embodiment. The group messaging collection indicator system 216 includes a messaging feed user interface module 402, a group profile user interface module 404, a group conversation user interface module 406, a group member collection system 412 that communicates with the collection management system 204.

The group member collection system 412 identities members of a group and detects whether one or more members of the group has shared new content collection (e.g., posted an active Story). The content collection may be referred to as "new" because the user of the client device 102 has not yet viewed the new content collection. In one example, The group member collection system 412 includes a group member identifier 410 and an active story detector 408.

The group member identifier 410 identifies members of a group. In one example, the group member identifier 410 communicates with the profile system 214 to retrieve profiles of the members of the group. The members of the group are users of a messaging application hosted on the messaging server 118. In one example, the members of the group are users of the group messaging collection indicator system 216.

The active story detector 408 detects whether one or more members of the group (where group member identifier 410 identified the members) has posted or shared new content collection. In one example, the active story detector 408 detects a request from a member of the group to post/share content collection via the messaging application/the group messaging collection indicator system 216. In another example, the active story detector 408 detects newly shared content collection from the collection management system 204. In response to detecting the request or the newly shared content collection from the member, the active story detector 408 communicates with the messaging feed user interface module 402, the group profile user interface module 404, and/or the group conversation user interface module 406 to generate a visual indicator of the new content collection for the group in the messaging application.

Figure 12:
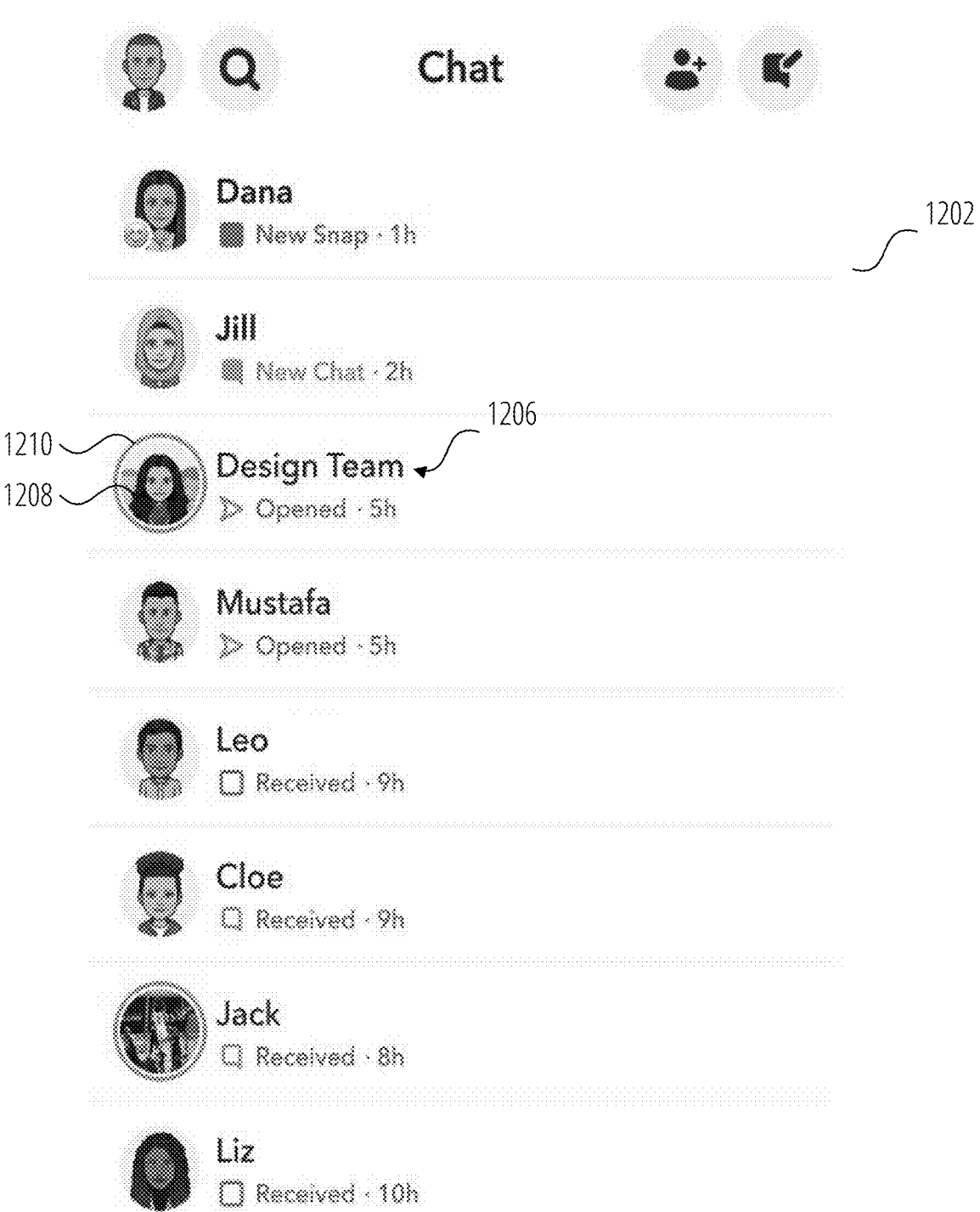
FIG. 12 is a diagram illustrating an example of a messaging feed user interface in accordance with one example embodiment.

The messaging feed user interface module 402 generates a messaging feed user interface that lists contacts/friends of the user of the client device 102. The messaging feed user interface can also be referred to as "Friends Feed." In one example, if at least one member of a group has an active Story (that the user of the client device 102 can view), the messaging feed user interface module 402 generates and displays a visual indicator for the group avatar. For example, the visual indicator includes a ring around the group avatar/icon in the messaging feed user interface as illustrated in FIG. 12.

In other example embodiments, the messaging feed user interface module 402 does not display the visual indicator for "Private Stories" that the user of the client device 102 cannot view. In other words, the newly posted content collection is not viewable by the user of the client device 102.

The messaging feed user interface module 402 detects whether the user of the client device 102 has viewed all content collection posted from group members. Once the user of the client device 102 has viewed all content collection posted from group members, the messaging feed user interface module 402 disables/hides the visual indicator in the messaging feed user interface.

The messaging feed user interface module 402 also detects whether the user of the client device 102 has tapped/selected the visual indicator (e.g., the ring). Tapping the visual indicator (1) opens the group profile or (2) opens the active Stories of the group in a full screen player. Existing Stories are replayed in the same order as in the group profile or in recency.

Figure 13:
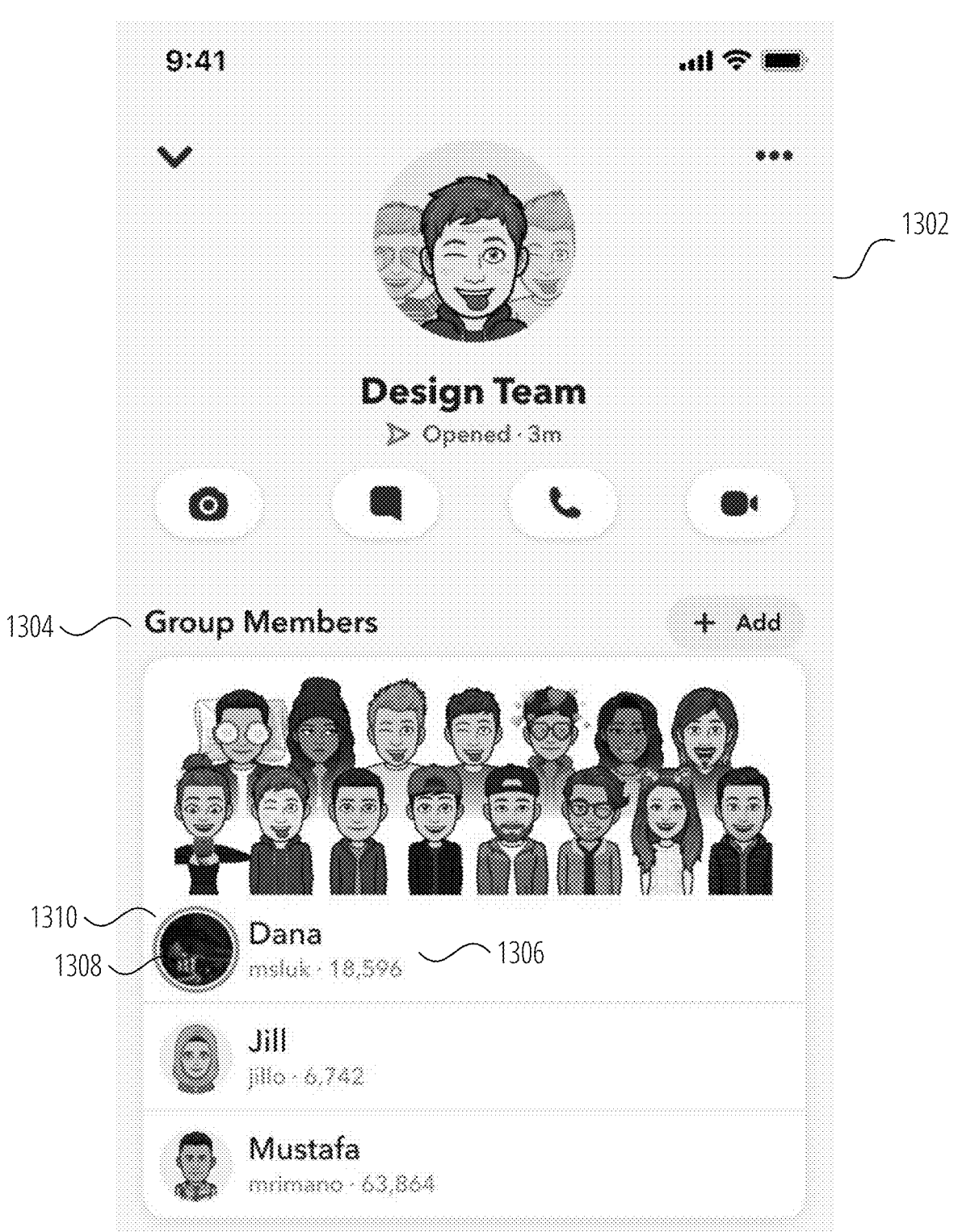
FIG. 13 is a diagram illustrating an example of a group profile user interface in accordance with one example embodiment.

The group profile user interface module 404 generates a group profile user interface that lists members of the group. In one example, the group profile user interface (e.g., group members section) displays members who have an active Story at the top of the list. In one example, a visual indicator such as a ring is displayed around the avatar of the member with active Story as illustrated in FIG. 13. In another example, instead of the avatar, the Story thumbnail is shown for each member with an active story.

Figure 14:
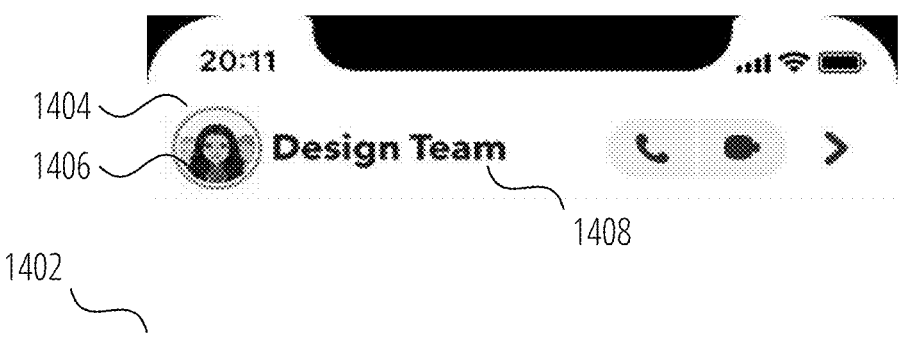
FIG. 14 is a diagram illustrating an example of a group conversation user interface in accordance with one example embodiment.
Figure 14:
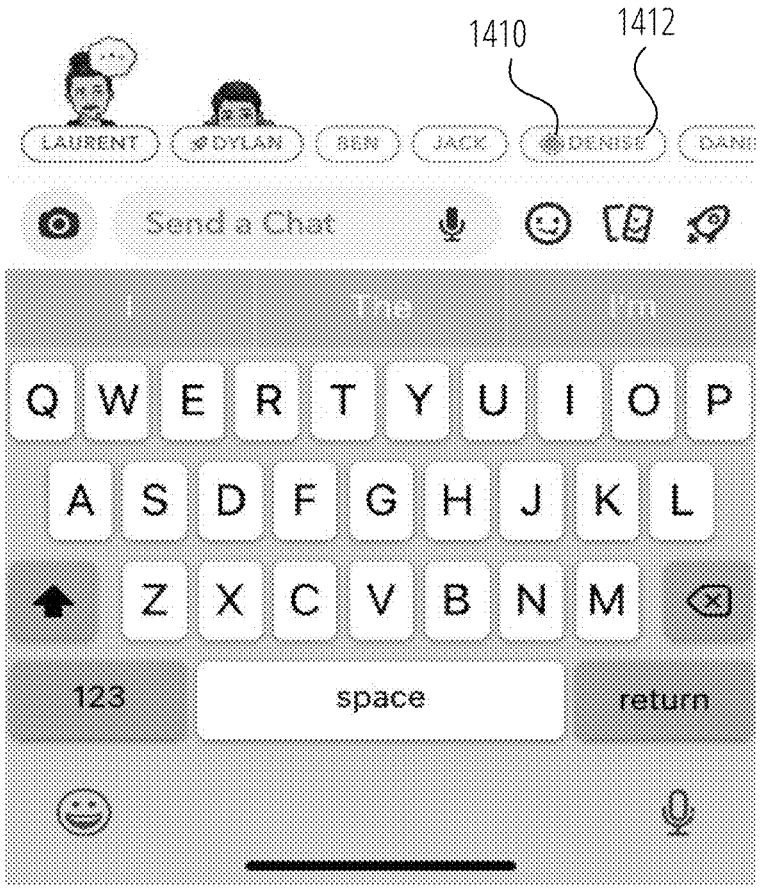

The group conversation user interface module 406 generates a group conversation user interface that enables the user of the client device 102 to write a message/send a chat with a group. If any group member has an active Story, the group conversation user interface module 406 generates and displays a blue story ring around the group avatar in the header as illustrated in FIG. 14. In one example, the group conversation user interface module 406 displays a presence pill carousel and displays a ring or a thumbnail of a member's active story in the presence pill as illustrated in FIG. 14.

FIG. 5 is a schematic diagram illustrating data structures 500, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 506. This message data includes, for any particular one message, at least message sender data, message recipient (or receiver) data, and a payload. Further details regarding information that may be included in a message, and included within the message data stored in the message table 506 is described below with reference to FIG. 6.

An entity table 508 stores entity data, and is linked (e.g., referentially) to an entity graph 504 and profile data 502. Entities for which records are maintained within the entity table 508 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 504 stores information regarding relationships and associations between entities. Such relationships may be social, professional (e.g., work at a common corporation or organization) interested-based or activity-based, merely for example.

The profile data 502 (e.g., in conjunction with the profile system 214) stores multiple types of profile data about a particular entity. The profile data 502 may be selectively used and presented to other users of the messaging system 100, based on privacy settings specified by a particular entity. Where the entity is an individual, the profile data 502 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 502 for the group may similarly include one or more avatar representations associated with the group, in addition to the group name, members, and various settings (e.g., notifications) for the relevant group.

The database 126 also stores augmentation data, such as overlays or filters, in an augmentation table 510. The augmentation data is associated with and applied to videos (for which data is stored in a video table 514) and images (for which data is stored in an image table 516).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 516 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 512 stores data regarding collections of messages and associated image, video, or audio data, which are compiled into a collection (e.g., a story or a gallery). The creation of a particular collection may be initiated by a particular user (e.g., each user for which a record is maintained in the entity table 508). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 514 stores video data that, in one example, is associated with messages for which records are maintained within the message table 506. Similarly, the image table 516 stores image data associated with messages for which message data is stored in the entity table 508. The entity table 508 may associate various augmentations from the augmentation table 510 with various images and videos stored in the image table 516 and the video table 514.

Figure 6:
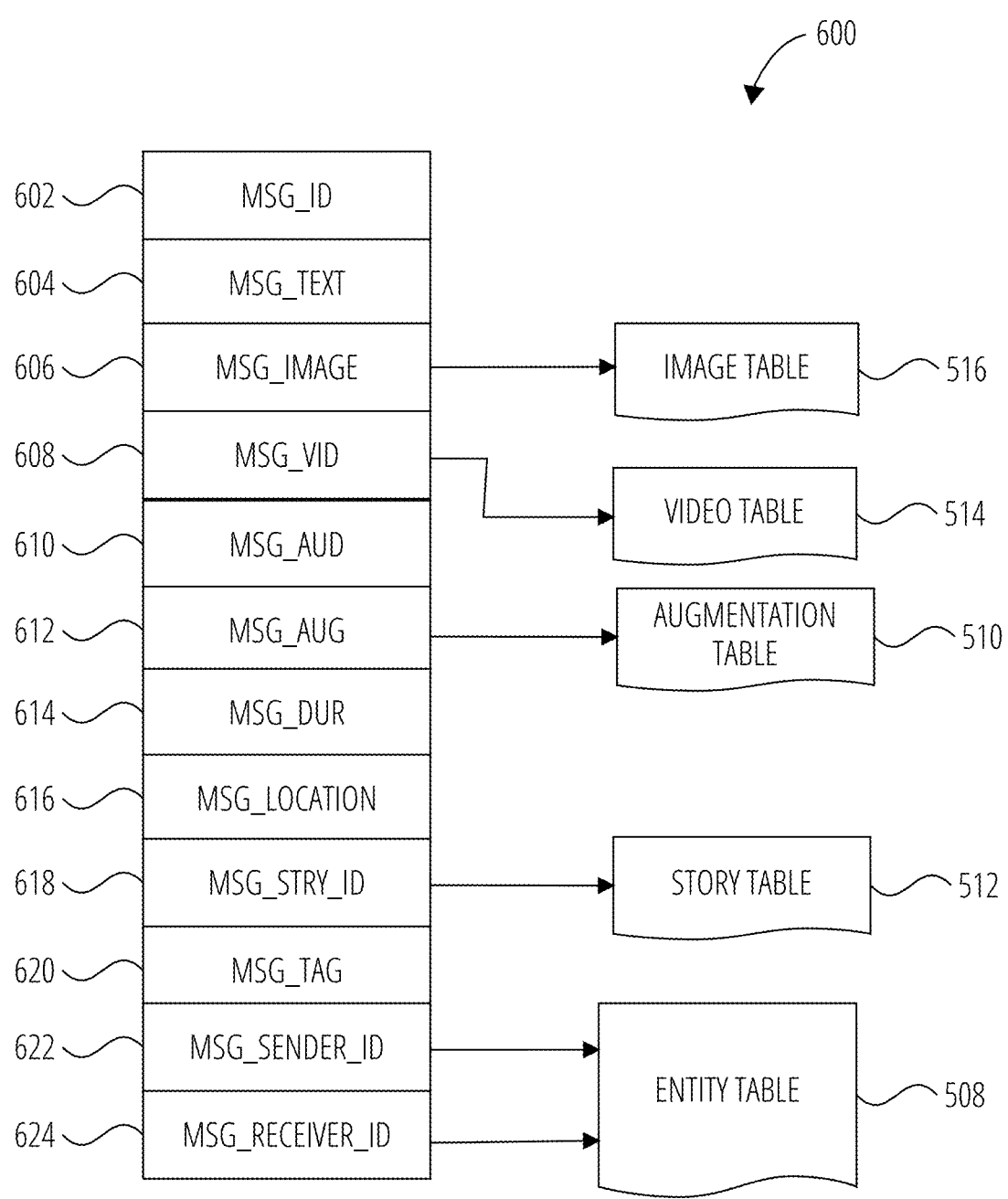
FIG. 6 is a diagrammatic representation of a message, in accordance with some examples.

FIG. 6 is a schematic diagram illustrating a structure of a message 600, according to some examples, generated by a messaging client 104 for communication to a further messaging client 104 or the messaging server 118. The content of a particular message 600 is used to populate the message table 506 stored within the database 126, accessible by the messaging server 118. Similarly, the content of a message 600 is stored in memory as "in-transit" or "in-flight" data of the client device 102 or the application servers 114. A message 600 is shown to include the following example components:

message identifier 602: a unique identifier that identifies the message 600.

message text payload 604: text, to be generated by a user via a user interface of the client device 102, and that is included in the message 600.

message image payload 606: image data, captured by a camera component of a client device 102 or retrieved from a memory component of a client device 102, and that is included in the message 600. Image data for a sent or received message 600 may be stored in the image table 516.

message video payload 608: video data, captured by a camera component or retrieved from a memory component of the client device 102, and that is included in the message 600. Video data for a sent or received message 600 may be stored in the video table 514.

message audio payload 610: audio data, captured by a microphone or retrieved from a memory component of the client device 102, and that is included in the message 600.

message augmentation data 612: augmentation data (e.g., filters, stickers, or other annotations or enhancements) that represents augmentations to be applied to message image payload 606, message video payload 608, or message audio payload 610 of the message 600. Augmentation data for a sent or received message 600 may be stored in the augmentation table 510.

message duration parameter 614: parameter value indicating, in seconds, the amount of time for which content of the message (e.g., the message image payload 606, message video payload 608, message audio payload 610) is to be presented or made accessible to a user via the messaging client 104.

message geolocation parameter 616: geolocation data (e.g., latitudinal and longitudinal coordinates) associated with the content payload of the message. Multiple message geolocation parameter 616 values may be included in the payload, each of these parameter values being associated with respect to content items included in the content (e.g., a specific image into within the message image payload 606, or a specific video in the message video payload 608).

message story identifier 618: identifier values identifying one or more content collections (e.g., "stories" identified in the story table 512) with which a particular content item in the message image payload 606 of the message 600 is associated. For example, multiple images within the message image payload 606 may each be associated with multiple content collections using identifier values.

message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.

message sender identifier 622: an identifier (e.g., a messaging system identifier, email address, or device identifier) indicative of a user of the Client device 102 on which the message 600 was generated and from which the message 600 was sent.

message receiver identifier 624: an identifier (e.g., a messaging system identifier, email address, or device identifier) indicative of a user of the client device 102 to which the message 600 is addressed.

The contents (e.g., values) of the various components of message 600 may be pointers to locations in tables within which content data values are stored. For example, an image value in the message image payload 606 may be a pointer to (or address of) a location within an image table 516. Similarly, values within the message video payload 608 may point to data stored within a video table 514, values stored within the message augmentations 612 may point to data stored in an augmentation table 510, values stored within the message story identifier 618 may point to data stored in a story table 512, and values stored within the message sender identifier 622 and the message receiver identifier 624 may point to user records stored within an entity table 508.

Figure 7:
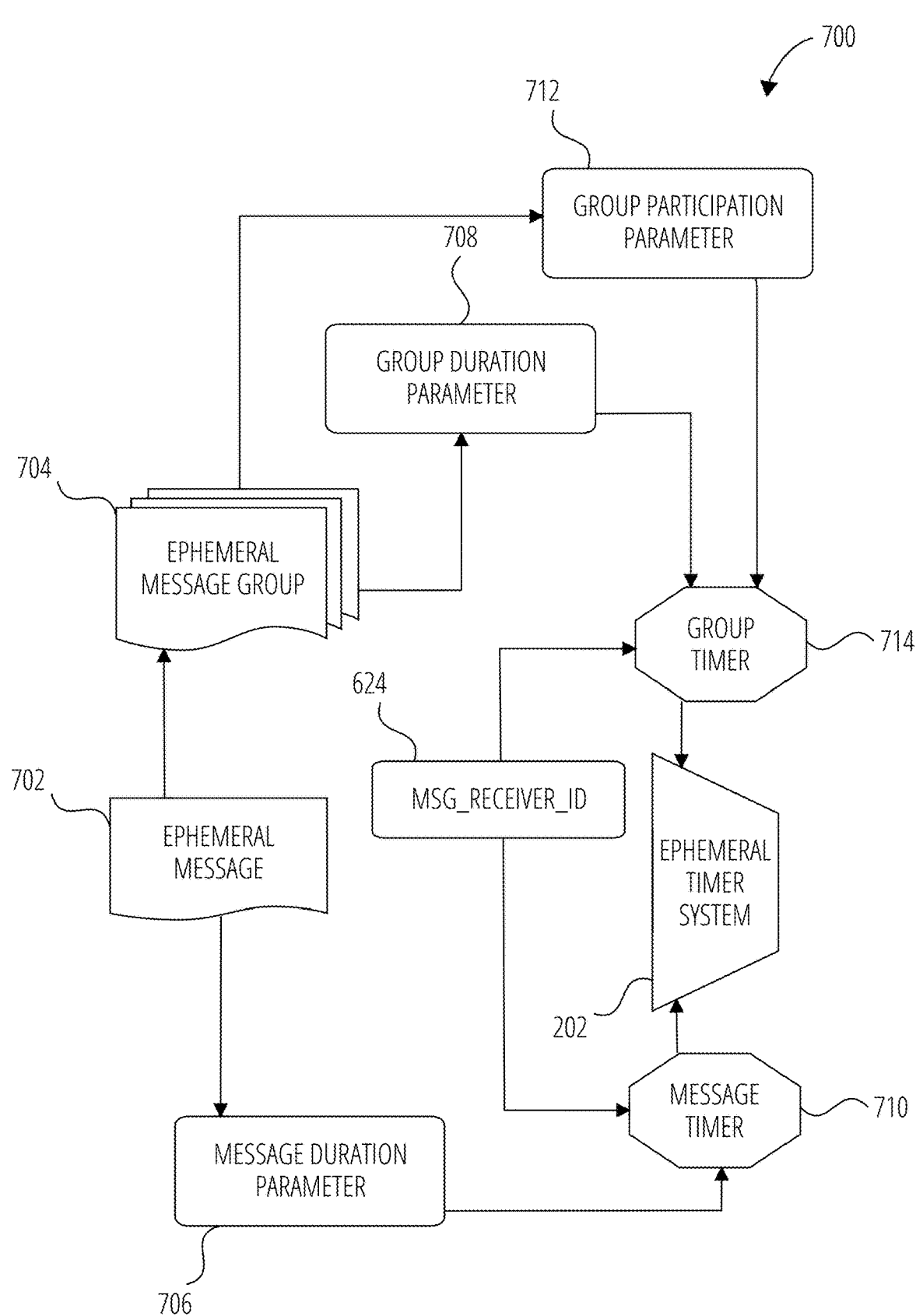
FIG. 7 is a flowchart for an access-limiting process, in accordance with some examples.

FIG. 7 is a schematic diagram illustrating an access-limiting process 700, in terms of which access to content (e.g., an ephemeral message 702, and associated multimedia payload of data) or a content collection (e.g., an ephemeral message group 704) may be time-limited (e.g., made ephemeral).

An ephemeral message 702 is shown to be associated with a message duration parameter 706, the value of which determines an amount of time that the ephemeral message 702 will be displayed to a receiving user of the ephemeral message 702 by the messaging client 104. In one example, an ephemeral message 702 is viewable by a receiving user for up to a maximum of 10 seconds, depending on the amount of time that the sending user specifies using the message duration parameter 706.

The message duration parameter 706 and the message receiver identifier 624 are shown to be inputs to a message timer 710, which is responsible for determining the amount of time that the ephemeral message 702 is shown to a particular receiving user identified by the message receiver identifier 624. In particular, the ephemeral message 702 will only be shown to the relevant receiving user for a time period determined by the value of the message duration parameter 706. The message timer 710 is shown to provide output to a more generalized ephemeral timer system 202, which is responsible for the overall timing of display of content (e.g., an ephemeral message 702) to a receiving user.

The ephemeral message 702 is shown in FIG. 7 to be included within an ephemeral message group 704 (e.g., a collection of messages in a personal story, or an event story). The ephemeral message group 704 has an associated group duration parameter 708, a value of which determines a time duration for which the ephemeral message group 704 is presented and accessible to users of the messaging system 100. The group duration parameter 708, for example, may be the duration of a music concert, where the ephemeral message group 704 is a collection of content pertaining to that concert. Alternatively, a user (either the owning user or a curator user) may specify the value for the group duration parameter 708 when performing the setup and creation of the ephemeral message group 704.

Additionally, each ephemeral message 702 within the ephemeral message group 704 has an associated group participation parameter 712, a value of which determines the duration of time for which the ephemeral message 702 will be accessible within the context of the ephemeral message group 704. Accordingly, a particular ephemeral message group 704 may "expire" and become inaccessible within the context of the ephemeral message group 704, prior to the ephemeral message group 704 itself expiring in terms of the group duration parameter 708. The group duration parameter 708, group participation parameter 712, and message receiver identifier 624 each provide input to a group timer 714, which operationally determines, firstly, whether a particular ephemeral message 702 of the ephemeral message group 704 will be displayed to a particular receiving user and, if so, for how long. Note that the ephemeral message group 704 is also aware of the identity of the particular receiving user as a result of the message receiver identifier 624.

Accordingly, the group timer 714 operationally controls the overall lifespan of an associated ephemeral message group 704, as well as an individual ephemeral message 702 included in the ephemeral message group 704. In one example, each and every ephemeral message 702 within the ephemeral message group 704 remains viewable and accessible for a time period specified by the group duration parameter 708. In a further example, a certain ephemeral message 702 may expire, within the context of ephemeral message group 704, based on a group participation parameter 712. Note that a message duration parameter 706 may still determine the duration of time for which a particular ephemeral message 702 is displayed to a receiving user, even within the context of the ephemeral message group 704. Accordingly, the message duration parameter 706 determines the duration of time that a particular ephemeral message 702 is displayed to a receiving user, regardless of whether the receiving user is viewing that ephemeral message 702 inside or outside the context of an ephemeral message group 704.

The ephemeral timer system 202 may furthermore operationally remove a particular ephemeral message 702 from the ephemeral message group 704 based on a determination that it has exceeded an associated group participation parameter 712. For example, when a sending user has established a group participation parameter 712 of 24 hours from posting, the ephemeral timer system 202 will remove the relevant ephemeral message 702 from the ephemeral message group 704 after the specified 24 hours. The ephemeral timer system 202 also operates to remove an ephemeral message group 704 when either the group participation parameter 712 for each and every ephemeral message 702 within the ephemeral message group 704 has expired, or when the ephemeral message group 704 itself has expired in terms of the group duration parameter 708.

In certain use cases, a creator of a particular ephemeral message group 704 may specify an indefinite group duration parameter 708. In this case, the expiration of the group participation parameter 712 for the last remaining ephemeral message 702 within the ephemeral message group 704 will determine when the ephemeral message group 704 itself expires. In this case, a new ephemeral message 702, added to the ephemeral message group 704, with a new group participation parameter 712, effectively extends the life of an ephemeral message group 704 to equal the value of the group participation parameter 712.

Responsive to the ephemeral timer system 202 determining that an ephemeral message group 704 has expired (e.g., is no longer accessible), the ephemeral timer system 202 communicates with the messaging system 100 (and, for example, specifically the messaging client 104) to cause an indicium (e.g., an icon) associated with the relevant ephemeral message group 704 to no longer be displayed within a user interface of the messaging client 104. Similarly, when the ephemeral timer system 202 determines that the message duration parameter 706 for a particular ephemeral message 702 has expired, the ephemeral timer system 202 causes the messaging client 104 to no longer display an indicium (e.g., an icon or textual identification) associated with the ephemeral message 702.

Figure 8:
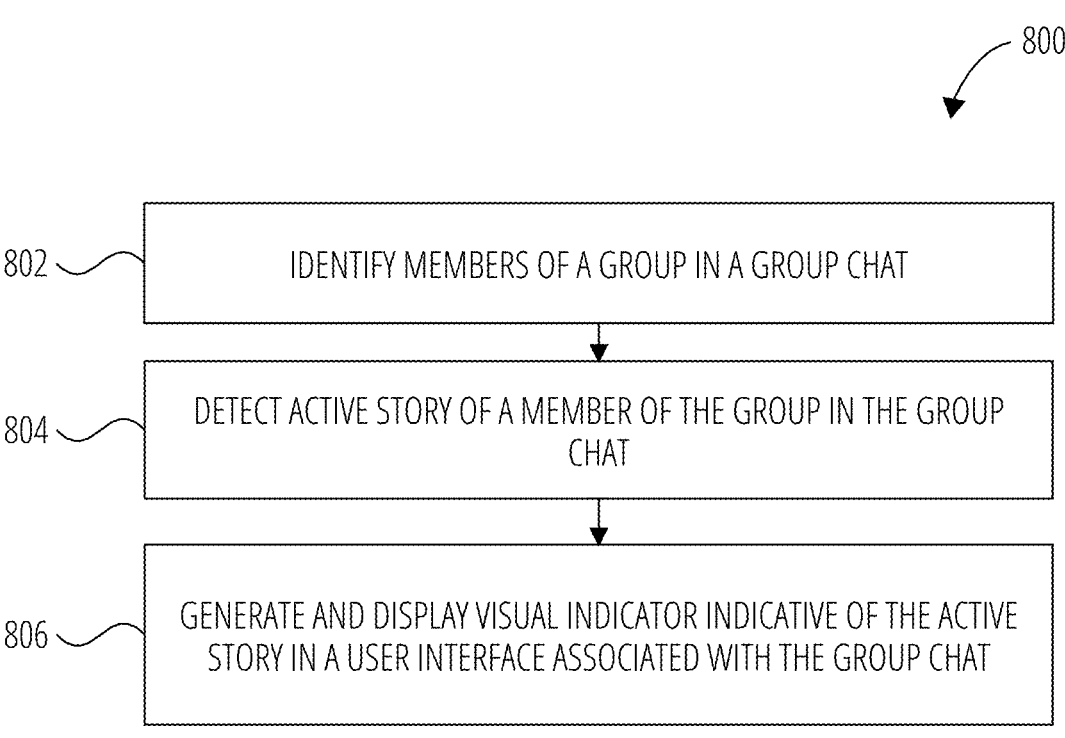
FIG. 8 is a flowchart illustrating a process for generating a visual indicator within a messaging system, in accordance with some examples.

FIG. 8 is a flowchart illustrating a process for generating a visual indicator within a messaging system, in accordance with some examples. For explanatory purposes, the process 800 is primarily described herein with reference to the group messaging collection indicator system 216 of FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

At block 802, the group member identifier 410 identifies members of a group in a group chat.

At block 804, the active story detector 408 detects an active Story of a member of a group in the group chat.

At block 806, the messaging feed user interface module 402/group profile user interface module 404/group conversation user interface module 406 generates a user interface indicative of the active Story in the user interface associated with the group chat.

Figure 9:
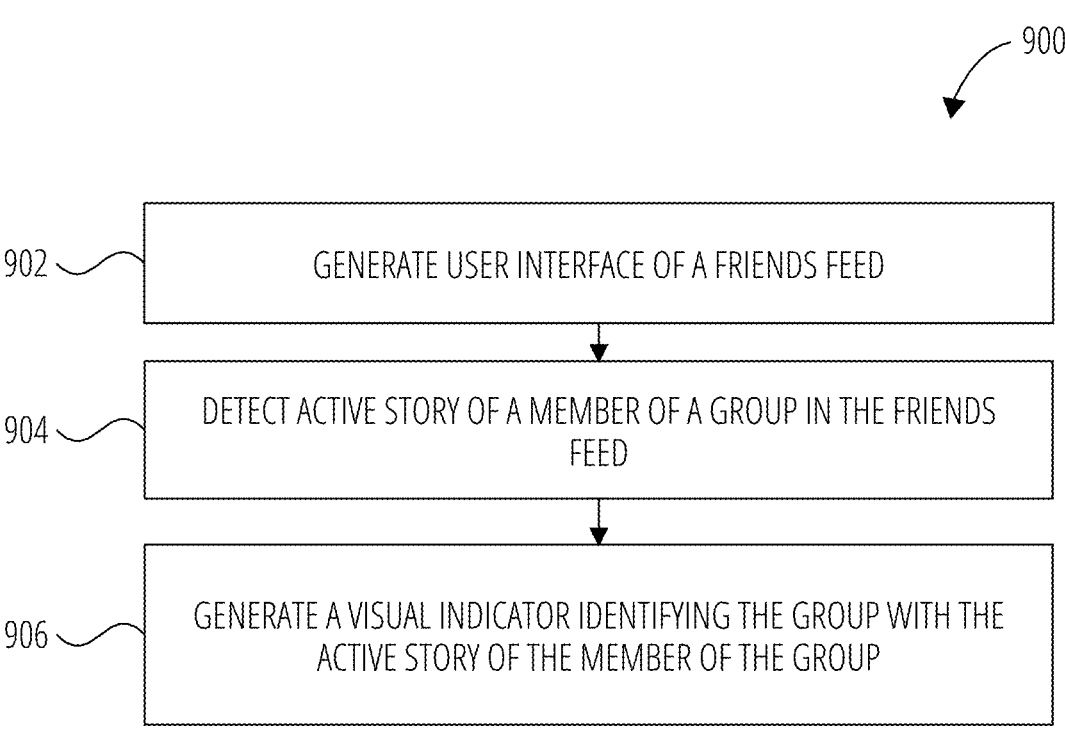
FIG. 9 is a flowchart illustrating a process for generating an indicator corresponding to active shared content of a group member within a messaging system, in accordance with some examples.

FIG. 9 is a flowchart illustrating a process for generating an indicator corresponding to active shared content of a group member within a messaging system, in accordance with some examples. For explanatory purposes, the process 900 is primarily described herein with reference to the group messaging collection indicator system 216 of FIG. 2. However, one or more blocks (or operations) of the process 900 may be performed by one or more other components, and/or by other suitable devices. Further for explanatory purposes, the blocks (or operations) of the process 900 are described herein as occurring in serial, or linearly. However, multiple blocks (or operations) of the process 900 may occur in parallel or concurrently. In addition, the blocks (or operations) of the process 900 need not be performed in the order shown and/or one or more blocks (or operations) of the process 900 need not be performed and/or can be replaced by other operations. The process 900 may be terminated when its operations are completed. In addition, the process 900 may correspond to a method, a procedure, an algorithm, etc.

At block 902, the messaging feed user interface module 402 generates a user interface of a friends feed.

At block 904, the active story detector 408 detects an active story of a member of a group in the friends feed.

At block 906, the messaging feed user interface module 402 generates a visual indicator identifying the group with the active story of the member of the group.

Figure 10:
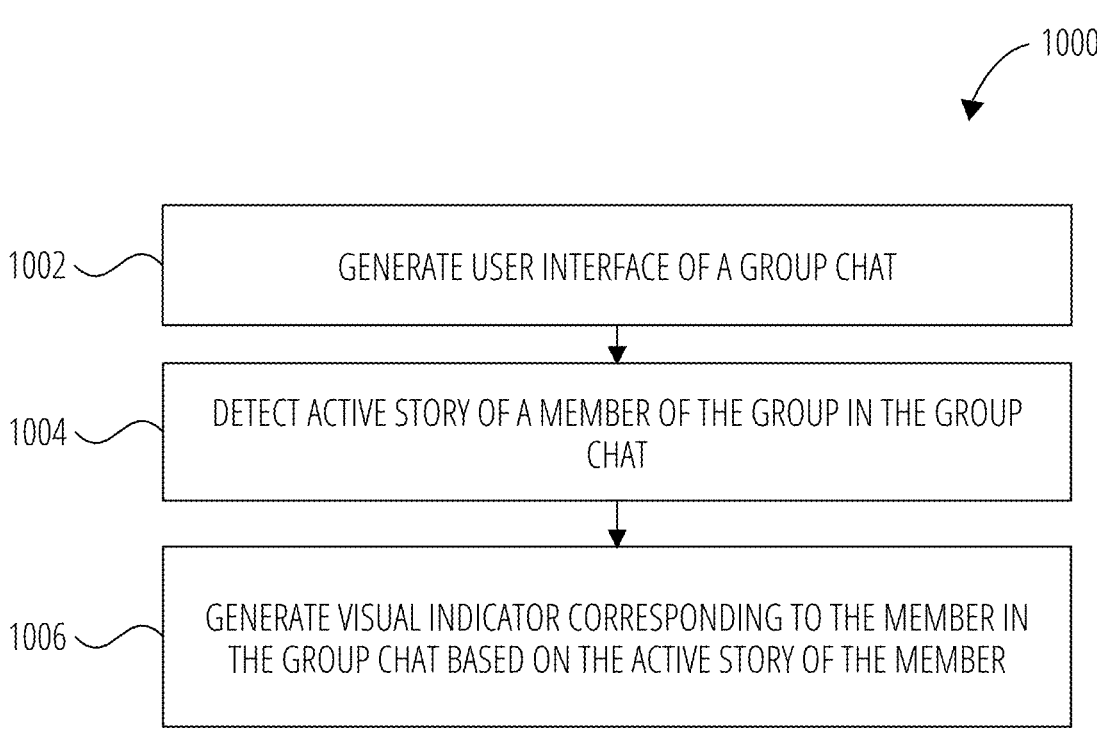
FIG. 10 is a flowchart illustrating a process for generating an indicator corresponding to active shared content of a group member within a messaging system, in accordance with some examples.

FIG. 10 is a flowchart illustrating a process for generating an indicator corresponding to active shared content of a group member within a messaging system, in accordance with some examples. For explanatory purposes, the process 1000 is primarily described herein with reference to the group messaging collection indicator system 216 of FIG. 2. However, one or more blocks (or operations) of the process 1000 may be performed by one or more other components, and/or by other suitable devices. Further for explanatory purposes, the blocks (or operations) of the process 1000 are described herein as occurring in serial, or linearly. However, multiple blocks (or operations) of the process 1000 may occur in parallel or concurrently. In addition, the blocks (or operations) of the process 1000 need not be performed in the order shown and/or one or more blocks (or operations) of the process 1000 need not be performed and/or can be replaced by other operations. The process 1000 may be terminated when its operations are completed. In addition, the process 1000 may correspond to a method, a procedure, an algorithm, etc.

At block 1002, the group profile user interface module 404 generates a user interface of a group chat.

At block 1004, the active story detector 408 detects an active story of a member of the group in the group chat.

At block 1006, the group profile user interface module 404 generates a visual indicator corresponding to the member in the group chat based on the active story of the member.

Figure 11:
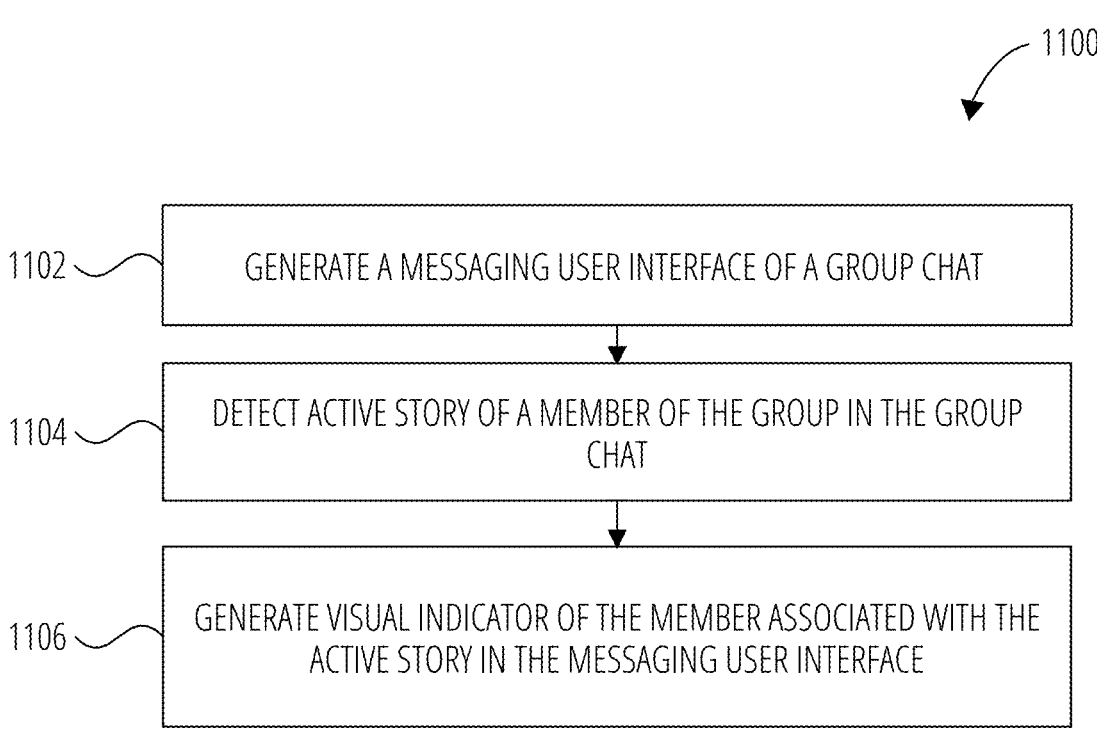
FIG. 11 is a flowchart illustrating a process for generating an indicator corresponding to active shared content of a group member within a messaging system, in accordance with some examples.

FIG. 11 is a flowchart illustrating a process for generating an indicator corresponding to active shared content of a group member within a messaging system, in accordance with some examples. For explanatory purposes, the process 1100 is primarily described herein with reference to the group messaging collection indicator system 216 of FIG. 2. However, one or more blocks (or operations) of the process 1100 may be performed by one or more other components, and/or by other suitable devices. Further for explanatory purposes, the blocks (or operations) of the process 1100 are described herein as occurring in serial, or linearly. However, multiple blocks (or operations) of the process 1100 may occur in parallel or concurrently. In addition, the blocks (or operations) of the process 1100 need not be performed in the order shown and/or one or more blocks (or operations) of the process 1100 need not be performed and/or can be replaced by other operations. The process 1100 may be terminated when its operations are completed. In addition, the process 1100 may correspond to a method, a procedure, an algorithm, etc.

At block 1102, the group conversation user interface module 406 generates a messaging user interface of a group chat.

At block 1104, the active story detector 408 detects an active story of a member of the group in the group chat.

At block 1106, the group conversation user interface module 406 generates a visual indicator of the member associated with the active story in the messaging user interface.

FIG. 12 is a diagram illustrating an example of a messaging feed user interface 1202 (e.g., chat user interface) in accordance with one example embodiment. The messaging feed user interface 1202 displays users and groups (e.g., design team 1206). In one example, the design team 1206 displays the avatar 1208 of the member with an active Story. The messaging feed user interface 1202 displays a ring 1210 around the avatar 1208 of the member with the active Story.

FIG. 13 is a diagram illustrating an example of a group profile user interface 1302 in accordance with one example embodiment. The group profile user interface 1302 identifies the member 1306 with an (unviewed) active Story. The group profile user interface 1302 replaces an avatar of the member 1306 with a thumbnail 1308 of the content collection/active Story. The group profile user interface 1302 also generates and displays a ring 1310 around the thumbnail 1308.

FIG. 14 is a diagram illustrating an example of a group conversation user interface 1402 in accordance with one example embodiment. The group conversation user interface 1402 displays the group label 1408 in a header. The group label 1408 includes an avatar 1406 of the group member 1412 (with an active Story) with a ring 1404 around the avatar 1406. The group conversation user interface 1402 also displays a ring 1410 in the presence pill of the group member 1412.

Figure 15:
FIG. 15 is a diagram illustrating a visual indicator of an active collection in accordance with one example embodiment.

FIG. 15 is a diagram illustrating a visual indicator of an active collection for a group 1502 in accordance with one example embodiment. The visual indicator includes a ring 1508 around an avatar 1506 of a member of the group 1502. A thumbnail 1510 of the active Story is added to a portion of the avatar 1506.

Figure 16:
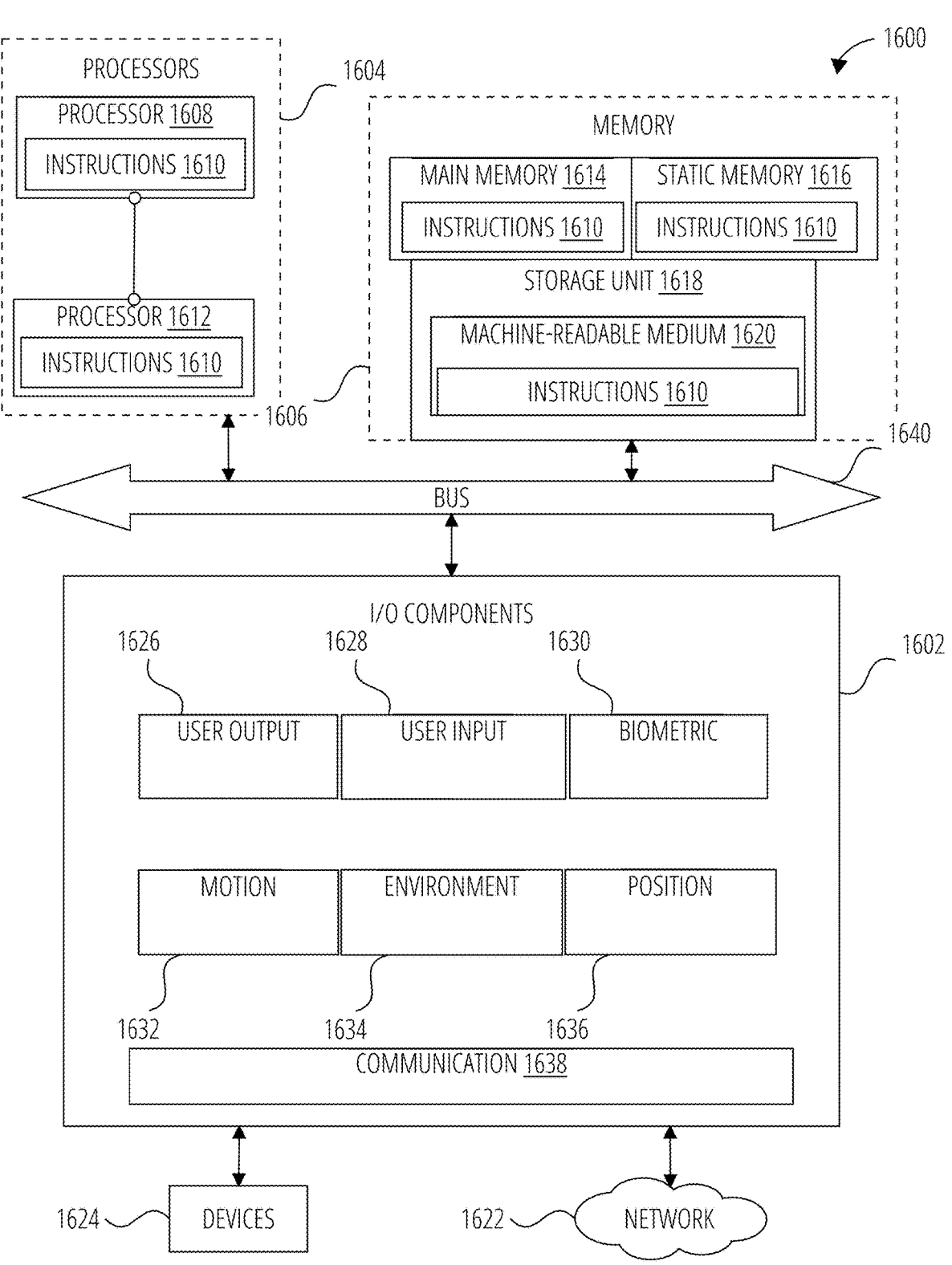
FIG. 16 is a diagrammatic representation of a machine in the form of a computer system within which a set of instructions may be executed for causing the machine to perform any one or more of the methodologies discussed herein, in accordance with some examples.

FIG. 16 is a diagrammatic representation of the machine 1600 within which instructions 1610 (e.g., software, a program, an application, an applet, an app, or other executable code) for causing the machine 1600 to perform any one or more of the methodologies discussed herein may be executed. For example, the instructions 1610 may cause the machine 1600 to execute any one or more of the methods described herein. The instructions 1610 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1610, sequentially or otherwise, that specify actions to be taken by the machine 1600. Further, while only a single machine 1600 is illustrated, the term "machine" shall also be taken to include a collection of machines that individually or jointly execute the instructions 1610 to perform any one or more of the methodologies discussed herein. The machine 1600, for example, may comprise the client device 102 or any one of a number of server devices forming part of the messaging server system 108. In some examples, the machine 1600 may also comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1602, which may be configured to communicate with each other via a bus 1640. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1608 and a processor 1612 that execute the instructions 1610. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1614, a static memory 1616, and a storage unit 1618, both accessible to the processors 1604 via the bus 1640. The main memory 1606, the static memory 1616, and storage unit 1618 store the instructions 1610 embodying any one or more of the methodologies or functions described herein. The instructions 1610 may also reside, completely or partially, within the main memory 1614, within the static memory 1616, within machine-readable medium 1620 within the storage unit 1618, within at least one of the processors 1604 (e.g., within the Processor's cache memory), or any suitable combination thereof, during execution thereof by the machine 1600.

The I/O components 1602 may include a wide variety of components to receive input, provide output, produce output, transmit information, exchange information, capture measurements, and so on. The specific I/O components 1602 that are included in a particular machine will depend on the type of machine. For example, portable machines such as mobile phones may include a touch input device or other such input mechanisms, while a headless server machine will likely not include such a touch input device. It will be appreciated that the I/O components 1602 may include many other components that are not shown in FIG. 16. In various examples, the I/O components 1602 may include user output components 1626 and user input components 1628. The user output components 1626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1602 may include biometric components 1630, motion components 1632, environmental components 1634, or position components 1636, among a wide array of other components. For example, the biometric components 1630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1632 include acceleration sensor components (e.g., accelerometer), gravitation sensor components, rotation sensor components (e.g., gyroscope).

The environmental components 1634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1602 further include communication components 1638 operable to couple the machine 1600 to a network 1622 or devices 1624 via respective coupling or connections. For example, the communication components 1638 may include a network interface Component or another suitable device to interface with the network 1622. In further examples, the communication components 1638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1624 may be another machine or any of a wide variety of peripheral devices (e.g., a peripheral device coupled via a USB).

Moreover, the communication components 1638 may detect identifiers or include components operable to detect identifiers. For example, the communication components 1638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1638, such as location via Internet Protocol (IP) geolocation, location via Wi-Fi® signal triangulation, location via detecting an NFC beacon signal that may indicate a particular location, and so forth.

The various memories (e.g., main memory 1614, static memory 1616, and memory of the processors 1604) and storage unit 1618 may store one or more sets of instructions and data structures (e.g., software) embodying or used by any one or more of the methodologies or functions described herein. These instructions (e.g., the instructions 1610), when executed by processors 1604, cause various operations to implement the disclosed examples.

The instructions 1610 may be transmitted or received over the network 1622, using a transmission medium, via a network interface device (e.g., a network interface component included in the communication components 1638) and using any one of several well-known transfer protocols (e.g., hypertext transfer protocol (HTTP)). Similarly, the instructions 1610 may be transmitted or received using a transmission medium via a coupling (e.g., a peer-to-peer coupling) to the devices 1624.

Figure 17:
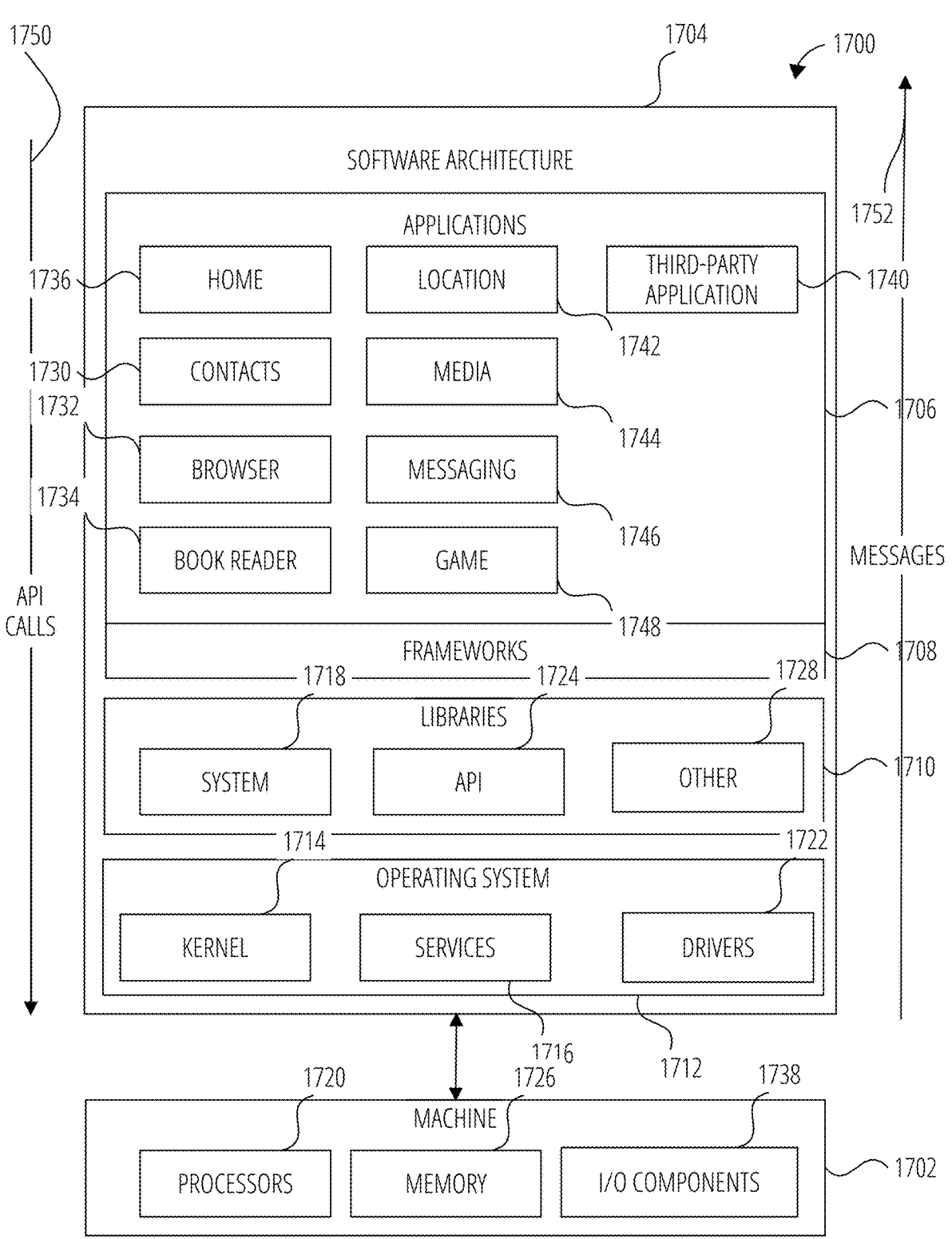
FIG. 17 is a block diagram showing a software architecture within which examples may be implemented.

FIG. 17 is a block diagram 1700 illustrating a software architecture 1704, which can be installed on any one or more of the devices described herein. The software architecture 1704 is supported by hardware such as a machine 1702 that includes processors 1720, memory 1726, and I/O components 1738. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1750 through the software stack and receive messages 1752 in response to the API calls 1750.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, processor management (e.g., scheduling), component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1710 provide a common low-level infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1710 can also include a wide variety of other libraries 1728 to provide many other APIs to the applications 1706.

The frameworks 1708 provide a common high-level infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example, the applications 1706 may include a home application 1736, a contacts application 1730, a browser application 1732, a book reader application 1734, a location application 1742, a media application 1744, a messaging application 1746, a game application 1748, and a broad assortment of other applications such as a third-party application 1740. The applications 1706 are programs that execute functions defined in the programs. Various programming languages can be employed to create one or more of the applications 1706, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1750 provided by the operating system 1712 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method, comprising: identifying members of a group in a messaging application; detecting an active sharing of content collection from a member of the group; and generating a visual indicator corresponding to the group in a user interface of the messaging application.

In Example 2, the subject matter of Example 1 includes, receiving user input from the member of the group to share the content collection with one or more members of the group, all members of the group, one or more users of the messaging application, one or more other users of the messaging application, or one or more other users outside the group; and in response to receiving the user input, enabling an ephemeral display of the content collection only from devices associated with the one or more members of the group, all members of the group, the one or more users of the messaging application, the one or more other users of the messaging application, or the one or more other users outside the group, wherein detecting the active sharing of content collection from the member of the group is based on receiving the user input from the member of the group.

In Example 3, the subject matter of Example 2 includes, wherein enabling the ephemeral display of the content collection comprises: posting the content collection to a network platform of the messaging application, the content collection being only viewable by the devices associated with the one or more members of the group, all members of the group, the one or more users of the messaging application, the one or more other users of the messaging application, or the one or more other users outside the group.

In Example 4, the subject matter of Examples 1-3 includes, detecting a user selection of the visual indicator in the user interface of the messaging application from an other member of the group; and in response to receiving the user selection of the visual indicator, enabling an ephemeral display of the content collection only from devices associated with the other member of the group.

In Example 5, the subject matter of Examples 1-4 includes, wherein the content collection comprises at least one media content item.

In Example 6, the subject matter of Examples 1-5 includes, displaying a messaging user interface of the messaging application, the messaging user interface comprising a list of users and the group; detecting a user selection of the visual indicator in the messaging user interface of the messaging application; and in response to detecting the user selection of the visual indicator in the messaging user interface of the messaging application, opening a group profile user interface of the messaging application or enabling an ephemeral display of the content collection, wherein the group profile user interface comprises a list of members of the group, wherein the visual indicator corresponds to the group in the messaging user interface.

In Example 7, the subject matter of Examples 1-6 includes, displaying a group profile user interface of the messaging application, the group profile user interface comprising a list of members of the group; detecting a user selection of the visual indicator in the group profile user interface of the messaging application; and in response to detecting the user selection of the visual indicator in the group profile user interface of the messaging application, enabling an ephemeral display of the content collection, wherein the visual indicator corresponds to the member of the group in the group profile user interface of the messaging application.

In Example 8, the subject matter of Example 7 includes, wherein the visual indicator comprises a ring surrounding a thumbnail of the content collection of the member.

In Example 9, the subject matter of Examples 7-8 includes, replacing a default profile icon of the member in the group profile user interface with a thumbnail of the content collection of the member.

In Example 10, the subject matter of Examples 1-9 includes, displaying a group conversation user interface of the messaging application, the group conversation user interface comprising presence pills of members of the group; detecting a user selection of the visual indicator in the group conversation user interface of the messaging application; and in response to detecting the user selection of the visual indicator in the group conversation user interface of the messaging application, enabling an ephemeral display of the content collection, wherein the visual indicator comprises a ring surrounding a thumbnail of the content collection of the member in a presence pill of the member in the group conversation user interface of the messaging application.

Example 11 is a system comprising: a processor; and a memory storing instructions that, when executed by the processor, configure the processor to perform operations comprising: identifying members of a group in a messaging application; detecting an active sharing of content collection from a member of the group; and generating a visual indicator corresponding to the group in a user interface of the messaging application.

In Example 12, the subject matter of Example 11 includes, wherein the operations further comprise: receiving user input from the member of the group to share the content collection with one or more members of the group, all members of the group, one or more users of the messaging application, one or more other users of the messaging application, or one or more other users outside the group; and in response to receiving the user input, enabling an ephemeral display of the content collection only from devices associated with the one or more members of the group, all members of the group, the one or more users of the messaging application, the one or more other users of the messaging application, or the one or more other users outside the group, wherein detecting the active sharing of content collection from the member of the group is based on receiving the user input from the member of the group.

In Example 13, the subject matter of Example 12 includes, wherein enabling the ephemeral display of the content collection comprises: posting the content collection to a network platform of the messaging application, the content collection being only viewable by the devices associated with the one or more members of the group, all members of the group, the one or more users of the messaging application, the one or more other users of the messaging application, or the one or more other users outside the group.

In Example 14, the subject matter of Examples 11-13 includes, wherein the operations further comprise: detecting a user selection of the visual indicator in the user interface of the messaging application from an other member of the group; and in response to receiving the user selection of the visual indicator, enabling an ephemeral display of the content collection only from devices associated with the other member of the group.

In Example 15, the subject matter of Examples 11-14 includes, wherein the content collection comprises at least one media content item.

In Example 16, the subject matter of Examples 11-15 includes, wherein the operations further comprise: displaying a messaging user interface of the messaging application, the messaging user interface comprising a list of users and the group; detecting a user selection of the visual indicator in the messaging user interface of the messaging application; and in response to detecting the user selection of the visual indicator in the messaging user interface of the messaging application, opening a group profile user interface of the messaging application or enabling an ephemeral display of the content collection, wherein the group profile user interface comprises a list of members of the group, wherein the visual indicator corresponds to the group in the messaging user interface.

In Example 17, the subject matter of Examples 11-16 includes, wherein the operations further comprise: displaying a group profile user interface of the messaging application, the group profile user interface comprising a list of members of the group; detecting a user selection of the visual indicator in the group profile user interface of the messaging application; and in response to detecting the user selection of the visual indicator in the group profile user interface of the messaging application, enabling an ephemeral display of the content collection, wherein the visual indicator corresponds to the member of the group in the group profile user interface of the messaging application.

In Example 18, the subject matter of Example 17 includes, wherein the visual indicator comprises a ring surrounding a thumbnail of the content collection of the member.

In Example 19, the subject matter of Examples 11-18 includes, wherein the operations further comprise: displaying a group conversation user interface of the messaging application, the group conversation user interface comprising presence pills of members of the group; detecting a user selection of the visual indicator in the group conversation user interface of the messaging application; and in response to detecting the user selection of the visual indicator in the group conversation user interface of the messaging application, enabling an ephemeral display of the content collection, wherein the visual indicator comprises a ring surrounding a thumbnail of the content collection of the member in a presence pill of the member in the group conversation user interface of the messaging application.

Example 20 is a non-transitory computer-readable storage medium, the computer-readable storage medium including instructions that when executed by a computer, cause the computer to perform operations comprising: identifying members of a group in a messaging application; detecting an active sharing of content collection from a member of the group; and generating a visual indicator corresponding to the group in a user interface of the messaging application.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method, comprising:
identifying members of a group in a messaging application;
detecting an active sharing of content collection from a member of the group;
generating a visual indicator corresponding to the group in a user interface of the messaging application;
receiving user input from the member of the group to share the content collection with one or more members of the group, all members of the group, one or more users of the messaging application, one or more other users of the messaging application, or one or more other users outside the group; and
in response to receiving the user input, enabling an ephemeral display of the content collection only from devices associated with the one or more members of the group, all members of the group, the one or more users of the messaging application, the one or more other users of the messaging application, or the one or more other users outside the group,
wherein detecting the active sharing of content collection from the member of the group is based on receiving the user input from the member of the group.

2. The method of claim 1, wherein enabling the ephemeral display of the content collection comprises:
posting the content collection to a network platform of the messaging application, the content collection being only viewable by the devices associated with the one or more members of the group, all members of the group, the one or more users of the messaging application, the one or more other users of the messaging application, or the one or more other users outside the group.

3. The method of claim 1, further comprising:
detecting a user selection of the visual indicator in the user interface of the messaging application from another member of the group; and
in response to receiving the user selection of the visual indicator, enabling an ephemeral display of the content collection only from devices associated with the other member of the group.

4. The method of claim 1, wherein the content collection comprises at least one media content item.

5. The method of claim 1, further comprising:

displaying a messaging user interface of the messaging application, the messaging user interface comprising a list of users and the group;

detecting a user selection of the visual indicator in the messaging user interface of the messaging application; and in response to detecting the user selection of the visual indicator in the messaging user interface of the messaging application, opening a group profile user interface of the messaging application or enabling an ephemeral display of the content collection, wherein the group profile user interface comprises a list of members of the group, wherein the visual indicator corresponds to the group in the messaging user interface.

6. The method of claim 1, further comprising:

displaying a group profile user interface of the messaging application, the group profile user interface comprising a list of members of the group;

detecting a user selection of the visual indicator in the group profile user interface of the messaging application; and in response to detecting the user selection of the visual indicator in the group profile user interface of the messaging application, enabling an ephemeral display of the content collection, wherein the visual indicator corresponds to the member of the group in the group profile user interface of the messaging application.

7. The method of claim 6, wherein the visual indicator comprises a ring surrounding a thumbnail of the content collection of the member.

8. The method of claim 6, further comprising:

replacing a default profile icon of the member in the group profile user interface with a thumbnail of the content collection of the member.

9. The method of claim 1, further comprising:

displaying a group conversation user interface of the messaging application, the group conversation user interface comprising presence pills of members of the group;

detecting a user selection of the visual indicator in the group conversation user interface of the messaging application; and in response to detecting the user selection of the visual indicator in the group conversation user interface of the messaging application, enabling an ephemeral display of the content collection, wherein the visual indicator comprises a ring surrounding a thumbnail of the content collection of the member in a presence pill of the member in the group conversation user interface of the messaging application.

10. A system comprising:

a processor; and a memory storing instructions that, when executed by the processor, configure the processor to perform operations comprising:

identifying members of a group in a messaging application;

detecting an active sharing of content collection from a member of the group;

generating a visual indicator corresponding to the group in a user interface of the messaging application;

receiving user input from the member of the group to share the content collection with one or more members of the group, all members of the group, one or more users of the messaging application, one or more other users of the messaging application, or one or more other users outside the group; and in response to receiving the user input, enabling an ephemeral display of the content collection only from devices associated with the one or more members of the group, all members of the group, the one or more users of the messaging application, the one or more other users of the messaging application, or the one or more other users outside the group, wherein detecting the active sharing of content collection from the member of the group is based on receiving the user input from the member of the group.

11. The system of claim 10, wherein enabling the ephemeral display of the content collection comprises:

posting the content collection to a network platform of the messaging application, the content collection being only viewable by the devices associated with the one or more members of the group, all members of the group, the one or more users of the messaging application, the one or more other users of the messaging application, or the one or more other users outside the group.

12. The system of claim 10, wherein the operations further comprise:

detecting a user selection of the visual indicator in the user interface of the messaging application from another member of the group; and in response to receiving the user selection of the visual indicator, enabling an ephemeral display of the content collection only from devices associated with the other member of the group.

13. The system of claim 10, wherein the content collection comprises at least one media content item.

14. The system of claim 10, wherein the operations further comprise:

displaying a messaging user interface of the messaging application, the messaging user interface comprising a list of users and the group;

detecting a user selection of the visual indicator in the messaging user interface of the messaging application; and in response to detecting the user selection of the visual indicator in the messaging user interface of the messaging application, opening a group profile user interface of the messaging application or enabling an ephemeral display of the content collection, wherein the group profile user interface comprises a list of members of the group, wherein the visual indicator corresponds to the group in the messaging user interface.

15. The system of claim 10, wherein the operations further comprise:

displaying a group profile user interface of the messaging application, the group profile user interface comprising a list of members of the group;

detecting a user selection of the visual indicator in the group profile user interface of the messaging application; and in response to detecting the user selection of the visual indicator in the group profile user interface of the messaging application, enabling an ephemeral display of the content collection, wherein the visual indicator corresponds to the member of the group in the group profile user interface of the messaging application.

16. The system of claim 15, wherein the visual indicator comprises a ring surrounding a thumbnail of the content collection of the member.

17. The system of claim 10, wherein the operations further comprise:

displaying a group conversation user interface of the messaging application, the group conversation user interface comprising presence pills of members of the group;

detecting a user selection of the visual indicator in the group conversation user interface of the messaging application; and in response to detecting the user selection of the visual indicator in the group conversation user interface of the messaging application, enabling an ephemeral display of the content collection, wherein the visual indicator comprises a ring surrounding a thumbnail of the content collection of the member in a presence pill of the member in the group conversation user interface of the messaging application.

18. A non-transitory computer-readable storage medium, the computer-readable storage medium including instructions that when executed by a computer, cause the computer to perform operations comprising:

identifying members of a group in a messaging application;

detecting an active sharing of content collection from a member of the group;

generating a visual indicator corresponding to the group in a user interface of the messaging application;

receiving user input from the member of the group to share the content collection with one or more members of the group, all members of the group, one or more users of the messaging application, one or more other users of the messaging application, or one or more other users outside the group; and in response to receiving the user input, enabling an ephemeral display of the content collection only from devices associated with the one or more members of the group, all members of the group, the one or more users of the messaging application, the one or more other users of the messaging application, or the one or more other users outside the group, wherein detecting the active sharing of content collection from the member of the group is based on receiving the user input from the member of the group.

* * * * *